Jan. 26, 1943. W. B. MOORE ET AL 2,309,526
COFFEE MAKER
Filed July 2, 1941
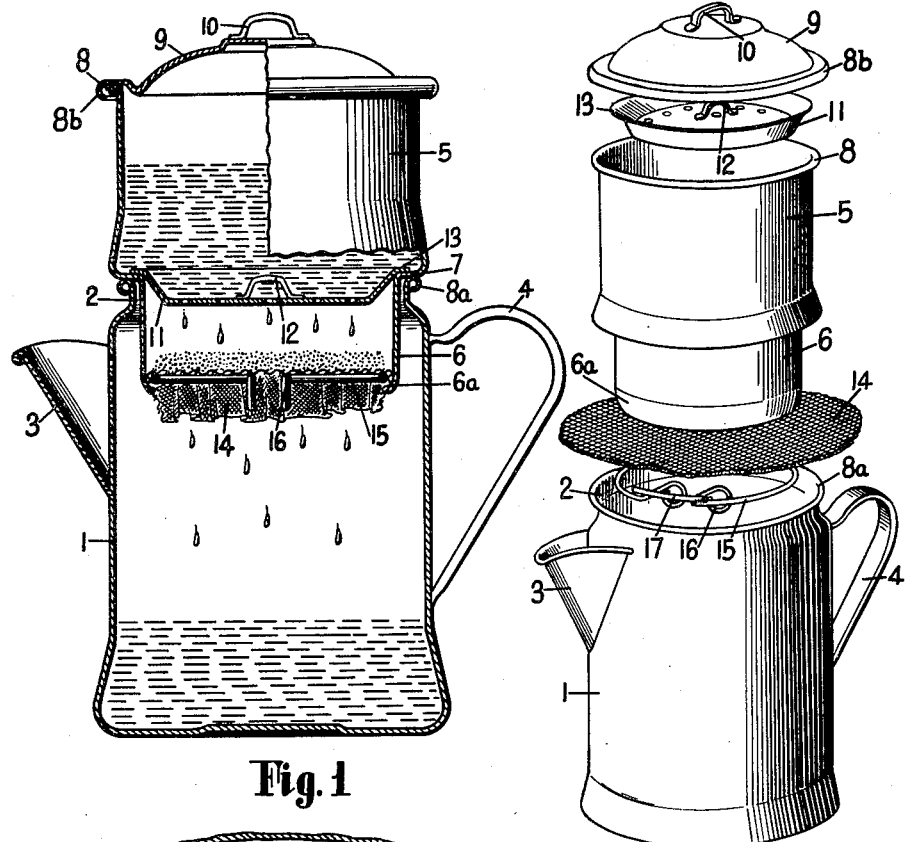
Fig. 2
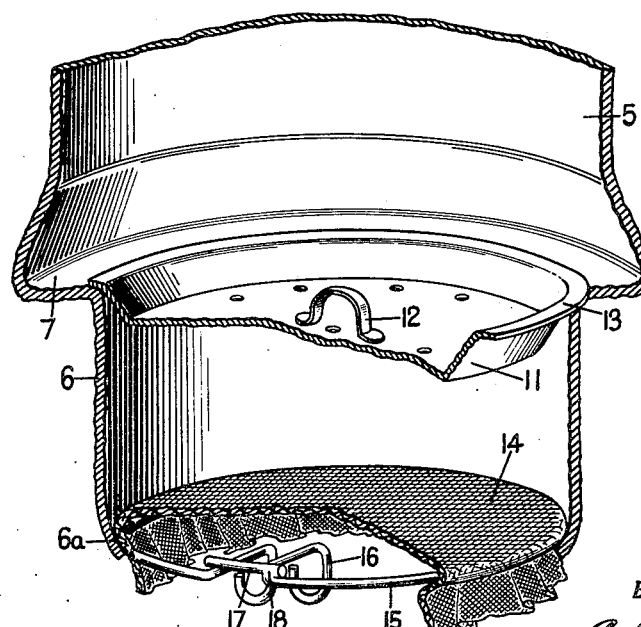
Fig. 1
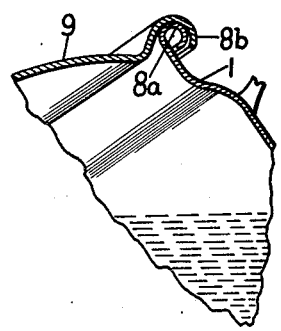
Fig. 3
Fig. 4
INVENTORS
Walter B. Moore.
Robert S. Cobb.
BY
ATTORNEYS Patented Jan. 26, 1943

2,309,526

UNITED STATES PATENT OFFICE 2,309,526

COFFEE MAKER

Walter B. Moore, Coshocton, and Robert S. Cobb, West Lafayette, Ohio, assignors to The Moore Enameling & Manufacturing Company, West Lafayette, Ohio, a corporation of Ohio Application July 2, 1941, Serial No. 400,762

1 Claim. (Cl. 53—3)

Our invention relates to coffee makers. It has to do, more particularly, with a device adapted to be used for making coffee by the French drip method.

One of the objects of our invention is to provide a coffee maker for making coffee by the French drip method which is of a very simple structure, being composed of a small number of parts, and being so constructed that it is easy to keep clean.

Another object of our invention is to provide a coffee maker of the French drip type which employs a cloth filter for ensuring that the coffee will be clear and free from all solid matter and which may be quickly and easily positioned in or removed from the coffee maker.

Another object of our invention is to provide a cloth filter which will be so firmly held in position that no grounds can seep into the coffee beverage.

Another object of our invention is to provide a retaining ring structure for holding the cloth filter in position, the ring being of a split type and being provided with means for holding its adjacent ends in alignment so that the ring will always be in a single plane and will always properly cooperate with its seat.

Another object of our invention is to provide a coffee maker of the type indicated wherein the cloth filter and retaining ring are carried by a container adapted to be mounted in the upper end of the coffee pot proper, such container being adapted to receive the ground coffee and the water poured thereover and being easily and quickly removable when the coffee is made.

Another object of our invention is to provide a coffee maker of the type indicated in the preceding paragraph wherein a lid is provided for fitting on the upper end of either the main container or the other container and which will be held in position on either of the containers upon which it might be disposed during the pouring of coffee from the main container.

The preferred embodiment of our invention is illustrated in the accompanying drawing wherein similar characters of reference designate corresponding parts and wherein:

Figure 1 is a vertical sectional view of a coffee maker constructed according to our invention.

Figure 2 is a perspective view showing the parts in spaced relationship.

Figure 3 is an enlarged vertical sectional view, partly broken away, illustrating the cloth filter and holder which are carried by a container separate from the main container or pot.

Figure 4 is a vertical sectional view showing how the lid is held in position when it is disposed on the upper container or the main container during pouring of coffee from the main container.

Referring more particularly to the drawing, we illustrate a main container 1 which is substantially cylindrical in shape and has an open upper end 2. The container 1 has a pouring lip 3 and a handle 4 formed on opposite sides thereof.

We provide a cylindrical container 5 with a depending reduced portion 6 adapted to fit into the open upper end 2 of the container 1. The container 1 is commonly referred to as the coffee pot and is adapted to receive the coffee beverage which is formed by the drip method. The upper portion of the container 5 is of substantially the same size as the container 1 and the wall of the container 5 flares outwardly towards its lower end. An inwardly extending shoulder portion 7 is formed at the upper end of portion 6, and is adapted to rest on the upper end of the container 1 as shown in Figure 1 of the drawing. The outer surface of the depending portion 6 is spaced from the container wall in order to permit free passage of the coffee beverage through the pouring lip 3. The lower end of the portion 6 is open. The extreme lower edge of portion 6 is crimped inwardly, as at 6a, to provide a seat for a retaining ring to be described. The upper end of the container 5 is also open and has an annular bead 8 formed thereon. As brought out in Figure 1, a cover member 9 has a curled edge portion which fits about the bead 8 in a suitable manner. A small handle grip 10 is disposed on the top of the lid 9.

An annular water spreader 11, having holes formed therein, is provided as shown. This member 11 has a small handle 12 for inserting and lifting the spreader member into and out of the cylindrical member 5. The spreader 11 has an annular flange 13 formed on its periphery which rests on the shoulder 7.

A filter or strainer member 14, on which the coffee grounds are adapted to be disposed, is mounted on the lower end of portion 6. This member consists of a piece of cloth of disk form. This cloth 14 is held in position by a wire retaining ring 15 best shown in Figure 3. The wire retaining ring 15 is formed from a piece of resilient wire which has its ends looped in the manner brought out by Figure 3, to form spaced inwardly extending finger grips 16. A short section of wire 17 is welded at 18 to one end of the ring in order to fill out the ring 15 and to hold the adjacent ends of the ring in alignment. The section 17 overlaps the other end of the ring and serves to keep all parts of the ring in a single plane. Finger grips 16 may be used for varying the size of the ring 15 so that it may be inserted in the lower end of the depending portion 6 with the cloth filter positioned thereon. As was brought out previously, the lower end of the portion 6 has the seat 6a formed thereon for receiving the retaining ring. The edges of the cloth will extend beyond the ring and will be clamped between the seat 6a and the ring when the ring is allowed to expand upon release of the finger grips 16.

The upper edge of the main container has an annular bead 8a formed thereon which is the same diameter as bead 8. Therefore, the lid 9 may be mounted either on rib 8 or rib 8a. It will be noted that lid 9 is provided with a depending flange 8b which is of semi-circular or curled cross-section. It will fit on and cooperate with either the rib 8 or the rib 8a. As shown in Figure 4, when the container 5 is removed and lid 9 is on the upper end of container 1, if the container 1 is tipped to pour coffee therefrom, the curled portion 8b of lid 9 will cooperate with a portion of bead 8a, at the side opposite to where spout 3 is disposed, to retain the lid in position. Similarly when container 5 is positioned on container 1 and lid 9 is on the upper end of container 5, the curved portion 8b will cooperate with a portion of bead 8 to hold the lid on the container 5 if it is tipped in any direction.

The operation of the device is as follows: The retaining ring 15 with the filter cloth 14 properly positioned about it is contracted slightly and is placed in the lower end of the depending portion 6. The retaining ring is then allowed to expand to grip the cloth and hold it on seat 6a. The container 5 is then telescopically positioned in the open upper end 2 of the container 1. The coffee grounds are then placed on the filter which is so tightly held against the seat 6a that no grounds will pass below the filter. The water spreader member 11 is placed on the shoulder 7 of the portion 5. This spreader member retards the flow of water which is then poured into the top of the portion 5. The spreader member distributes the water equally over the coffee grounds disposed on the filter 14. The drops of water will penetrate the coffee grounds and coffee will filter through member 14 and drop into the container 1 where it will remain until poured out the spout 3.

It will be apparent that this arrangement of parts has many advantages. The coffee device can be easily and quickly disassembled for cleaning, and the filter which we provide can be used a great number of times. The retaining ring solves the problem of holding the filter in position in such a manner that it will not be dislodged while the coffee making is taking place. Yet the retaining ring is so constructed that it can be easily positioned and removed at the will of the user. The filter structure is carried by member 5 which can be removed when the coffee is made.

The lid structure which we have provided prevents dropping off of the lid during pouring. This is true whether the lid be mounted on member 5 or member 1 during pouring of the coffee from member 1, as illustrated in Figure 4.

Many other advantages will be apparent from the above description, the drawing and the following claim.

Having thus described our invention, what we claim is:

In a coffee making device, a container, said container having an open lower end with its edge crimped inwardly to form a retaining ring seat, a split retaining ring adapted to cooperate with said seat, a filter cloth adapted to extend over said ring and to be gripped between the ring and the seat, said split ring having its ends spaced apart and having finger grips formed thereon by means of which the ring may be contracted, said finger grips comprising loops formed at the ends of the ring and which extend inwardly at right angles thereto, and a portion on one of the ends of the ring which extends beyond the finger grip formed thereon and overlaps the other end of the ring to maintain alignment of the ends of the ring.

WALTER B. MOORE.
ROBERT S. COBB.